United States Patent
Jack et al.

(10) Patent No.: US 9,565,531 B2
(45) Date of Patent: Feb. 7, 2017

(54) AUGMENTED BEACON AND GEO-FENCE SYSTEMS AND METHODS

(71) Applicant: Frensee LLC, Las Vegas, NV (US)

(72) Inventors: William W. Jack, Hudson Village, OH (US); Benjamin J. Taylor, Las Vegas, NV (US)

(73) Assignee: Frensee LLC, Las Vegas, NV (US)

( * ) Notice: Subject to any disclaimer, the term of this patent is extended or adjusted under 35 U.S.C. 154(b) by 0 days.

(21) Appl. No.: 15/091,265

(22) Filed: Apr. 5, 2016

(65) Prior Publication Data

US 2016/0302037 A1  Oct. 13, 2016

Related U.S. Application Data

(60) Provisional application No. 62/146,606, filed on Apr. 13, 2015.

(51) Int. Cl.
*H04M 3/42* (2006.01)
*H04W 24/00* (2009.01)
*H04W 4/02* (2009.01)
*H04W 4/18* (2009.01)

(52) U.S. Cl.
CPC ............. *H04W 4/023* (2013.01); *H04W 4/028* (2013.01); *H04W 4/18* (2013.01)

(58) Field of Classification Search
CPC .... G06Q 30/02; G06Q 50/01; G06Q 30/0261; G06Q 30/0207; H04W 4/02; H04W 4/206; H04W 4/023
USPC ................................ 455/414.1, 456.1, 456.3
See application file for complete search history.

(56) References Cited

U.S. PATENT DOCUMENTS

| | | | |
|---|---|---|---|
| 7,433,694 B2 | 10/2008 | Morgan et al. | |
| 7,904,064 B2 | 3/2011 | Frank et al. | |
| RE42,927 E | 11/2011 | Want et al. | |
| 8,311,543 B2 | 11/2012 | Dravida et al. | |

(Continued)

FOREIGN PATENT DOCUMENTS

| EP | 1883185 A1 | 1/2008 |
|---|---|---|
| WO | WO-2014200708 A2 | 12/2014 |
| WO | WO-2015148213 A1 | 10/2015 |

OTHER PUBLICATIONS

Barton, J., et al., (Feb. 1, 2001) "The Cooltown User Experience," Hewlett Packard, Retrieved from the Hewlett Packard website on Jan. 26, 2001 at URL: <http://www.hpl.hp.com/techreports/2001/HPL-2001-22.pdf>, (6 pages).

(Continued)

Primary Examiner — Dung Hong
(74) Attorney, Agent, or Firm — Goodwin Procter LLP

(57) ABSTRACT

Systems and methods for providing augmented beacons are described. In one implementation, an augmented beacon server receives a definition of an augmented beacon defining a geographical area of interest, where digital content is associated with the augmented beacon. Based on a determination that a target device is within the geographical area of interest of the augmented beacon, the augmented beacon server provides an unique identifier associated with the augmented beacon to the target device, where the unique identifier comprises an indication that the digital content associated with the augmented beacon can be displayed by the target device.

30 Claims, 6 Drawing Sheets

(56) References Cited

U.S. PATENT DOCUMENTS

| | | | |
|---|---|---|---|
| 8,321,497 B1* | 11/2012 | Steiner | G06F 17/30861 455/456.1 |
| 8,694,676 B2 | 4/2014 | Sen et al. | |
| 8,738,024 B1 | 5/2014 | Kerr et al. | |
| 8,805,352 B2 | 8/2014 | Mathews | |
| 8,847,754 B2 | 9/2014 | Buchheim et al. | |
| 8,862,067 B2 | 10/2014 | Un et al. | |
| 9,043,222 B1* | 5/2015 | Kerr | G06Q 30/0621 705/14.58 |
| 9,363,784 B1* | 6/2016 | Friday | H04W 64/003 |
| 2002/0091568 A1 | 7/2002 | Kraft et al. | |
| 2004/0030491 A1 | 2/2004 | Hull | |
| 2006/0166740 A1 | 7/2006 | Sufuentes | |
| 2007/0124721 A1 | 5/2007 | Cowing et al. | |
| 2007/0214041 A1* | 9/2007 | Patel | G06Q 30/02 705/14.55 |
| 2009/0227374 A1 | 9/2009 | Tirpak et al. | |
| 2011/0053618 A1* | 3/2011 | Lin | H04L 12/585 455/466 |
| 2012/0316963 A1* | 12/2012 | Moshfeghi | G06Q 20/20 705/14.58 |
| 2014/0004885 A1 | 1/2014 | Demaine | |
| 2014/0027411 A1 | 1/2014 | Voronin et al. | |
| 2014/0108197 A1 | 4/2014 | Smith et al. | |
| 2015/0332325 A1* | 11/2015 | Sharma | G06Q 30/02 705/14.57 |
| 2016/0005077 A1* | 1/2016 | McDevitt | G06Q 30/0208 705/14.58 |
| 2016/0073264 A1* | 3/2016 | Van den Broeck | H04W 4/021 455/411 |
| 2016/0163121 A1* | 6/2016 | Martin | G07B 15/02 705/13 |

OTHER PUBLICATIONS

Wikipedia, the free encyclopedia, "iBeacon," Retrieved from the wikipedia website on May 12, 2016 at URL: <http://en.wikipedia.org/wiki/IBeacon>, (8 pages).

* cited by examiner

AUGMENTED BEACON AND GEO-FENCE SYSTEMS AND METHODS

CROSS-REFERENCE TO RELATED APPLICATIONS

This application claims priority to and the benefit of U.S. Provisional Patent Application 62/146,606, filed on Apr. 13, 2015, and entitled "Augmented Beacon and Geo-fence Systems and Methods," the entirety of which is incorporated by reference herein.

TECHNICAL FIELD

The present disclosure relates generally to augmented beacon technology and, more particularly, to systems and methods for providing digital content to devices based on geographical proximity to virtually-defined areas of interest.

BACKGROUND

The modern internet has evolved past the need for stationary networked computing devices to transmit data. The profusion of billions of networked devices which are primarily mobile has given rise to the need to isolate smaller groups of devices, proximate to one another, for communications. This proximate area, termed a geo-fence, is often set by a low-power radio signal using, for example, the Bluetooth® wireless transmission standard. However, this approach, as manifested by beacons from vendors such as Apple, Inc., has numerous disadvantages, such as requiring a separate network and a radio connection. In addition, these devices must be individually powered and maintained in order to function properly.

BRIEF SUMMARY

Systems and methods for an augmented beacon and geo-fence system are described herein. Augmented beacons can be used to replace and/or enhance a physical beacon network. In addition, personalized and user-defined geo-fences provide an experience that avoids the dependence upon radio strength and connectivity, as well as advertiser-driven choices, by restricting unwanted beacon messages while accessing desirable and locally relevant augmented and phantom augmented messages from the cloud. This combination of both real and augmented beacons within a geo-fence of a user's design optimizes the user's experience.

Accordingly, in one aspect, a computer-implemented method includes the steps of receiving a definition of an augmented beacon including a geographical area of interest, wherein digital content is associated with the augmented beacon; determining that a target device is within the geographical area of interest of the augmented beacon; and, in response to the determination, providing a unique identifier associated with the augmented beacon to the target device, wherein the unique identifier includes an indication that the digital content associated with the augmented beacon can be displayed by the target device.

In one implementation, the geographical area of interest includes geographical coordinates and a defined area based on the geographical coordinates. The digital content can be a text message, an image, a digital credential or certificate, machine-readable code, a videographic message, a multi-dimensionally-projected message, and/or other content of interest to the user. The target device can be a smartphone, a tablet, a smart watch, smart glasses, a laptop, a vehicle, a stand-alone sensor, an appliance, a robot, or other mobile device.

In another implementation, an object in motion associated with the augmented beacon is identified and a geographical location of the object as it moves over time is determined. The definition of the augmented beacon is updated based on the geographical location of the object. The object can be a vehicle, a person, or a mobile device. The location of the object can be determined by periodically receiving location data associated with the object or determining an approximate location of the object based on a predefined schedule.

In a further implementation, an application is provided for creation and configuration of the augmented beacon. The definition of the augmented beacon can be editable by a defined group of users. Information associated with the augmented beacon can be provided to a geographical mapping interface on the device. A source of the digital content can be whitelisted based on a preexisting association of a user of the target device with the source of the digital content.

In yet another embodiment, a notification is provided to the device from one of the augmented beacon and a physical beacon; a confirmation is received from the other of the augmented beacon and the physical beacon; and, in response to receiving the confirmation, an indication is provided that digital content associated with at least one of the augmented beacon and the physical beacon can be delivered to the target device. The physical beacon can be geographically colocated with the augmented beacon.

In another embodiment, a transaction is authorized based on the determination that a target device is within the geographical area of interest of the augmented beacon.

Other embodiments of the above aspect include corresponding systems and computer programs. The details of one or more implementations of the subject matter described in the present specification are set forth in the accompanying drawings and the description below. Other features, aspects, and advantages of the subject matter will become apparent from the description, the drawings, and the claims to persons of ordinary skill in the art and are considered to be within the scope of this disclosure.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Described herein are systems and methods for providing software-based augmented beacons that can replace and/or enhance a physical local radio network. An augmented beacon generally refers to a software-based definition of an area of interest that corresponds to a physical, geographical location, and which can be associated with digital content that is delivered to and/or displayed by a user device when the user device is within the area of interest. The area of interest can be one or more points corresponding to one or more global positioning system (GPS) coordinates (e.g., latitude and longitude coordinates) or other coordinates in two or three dimensions (e.g., x, y, and z coordinates). The area of interest can also include a two- or three-dimensional area based on one or more point coordinates (e.g., a rectangle, circle, or other complex or simple shape encompassing or representing a geographical area, for example, a complex shape reflecting the boundaries of a campus or retail center). In one implementation, the area of interest includes a geo-fence or a physical area in which communication between an augmented beacon and a target device is permitted. An augmented beacon can have associated digital information and can share the information with target devices on the internet or other networks without the need for physical hardware in proximity to the target device. As an example, whereas a physical Apple® iBeacon™ device can transmit a commercial offer to a potential customer walking near a store where the device is located, the present system allows the same prospective customer to access that signal remotely, to learn if the store is making an offer. In the same manner, a competitor of the first store could use an augmented beacon to make a competing offer to the prospective customer walking past the first store. Other implementations of augmented beacons are contemplated and are described further herein.

Figure 1:
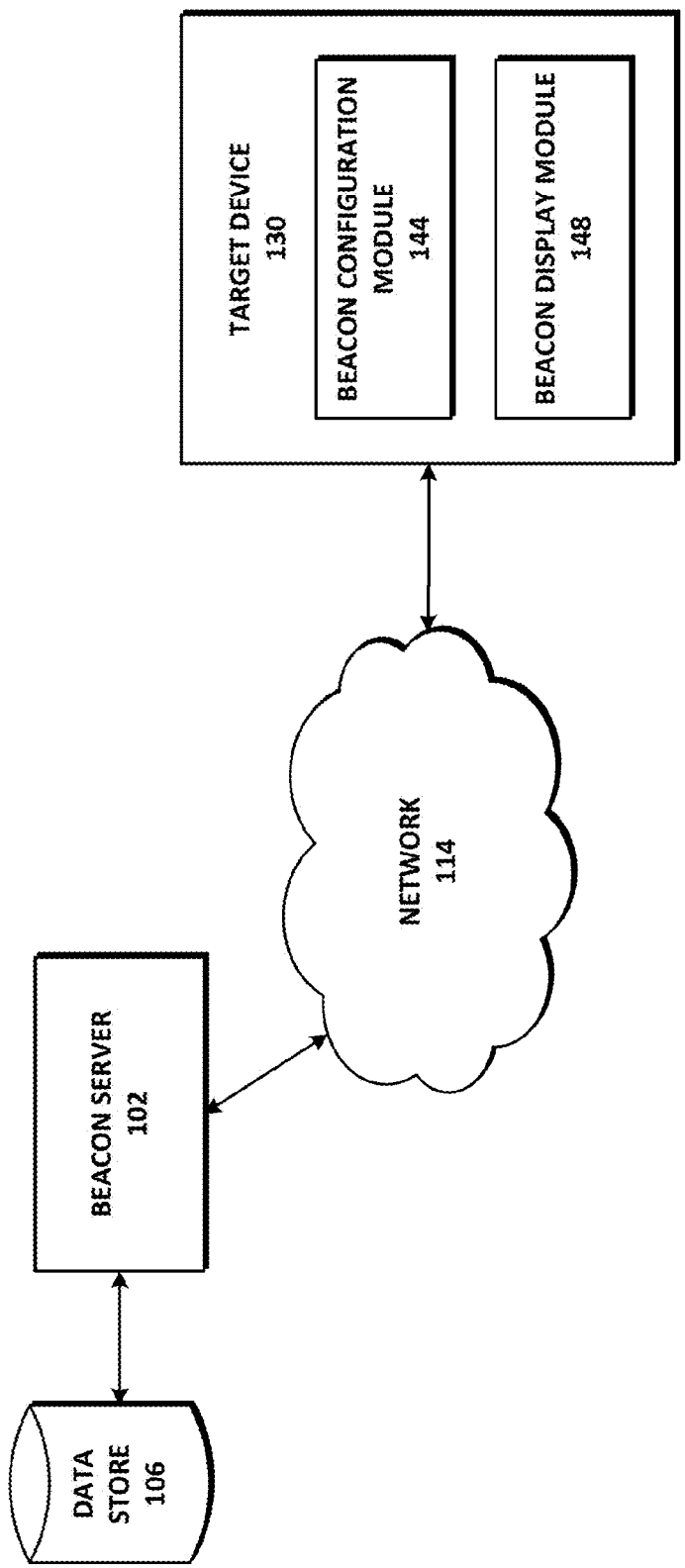
FIG. 1 depicts a high-level architecture of an augmented beacon and geo-fence system according to one implementation of the invention.

Referring to FIG. 1, one implementation of a system for providing augmented beacons includes beacon server 102 and one or more target devices 130, typically many target devices 130. Beacon server 102 stores data associated with augmented beacons in data store 106. Data store 106 can take various forms, for example, it can be a database such as the MySQL Database Server or Oracle® Database Server, the PostgreSQL Database Server, or the IBM DB2 Database Server. Augmented beacon data stored in data store 106 can include augmented beacon locations (e.g., coordinates), defined areas around the augmented beacon locations, information associated with augmented beacon owners, sponsors, editors, or other persons or entities that are permitted to access and/or configure particular augmented beacons, identifiers associated with content that can be delivered by augmented beacons, and other useful data. Beacon server 102 determines when a target device 130 is within an augmented beacon's defined area, based on the information in data store 106 and target device location information (e.g., GPS coordinates, Wi-Fi signal information, etc.) received directly or indirectly from a target device 130. If a target device 130 is determined to be within the area defined by an augmented beacon, beacon server 102 can deliver content associated with the augmented beacon (or indicate that such content should be delivered) to the target device 130. Beacon server 102 can also take other action depending on whether target device 130 is determined to be within or outside the defined area, for example, in the instances of location verification or fraud detection, further described below.

The target device 130 can be a smartphone, tablet computer, smart watch, smart glasses, portable computer, mobile telephone, laptop, palmtop, smart television, vehicle, robot, stand-alone sensor, desktop computer, wireless device, appliance, workstation, and/or other computing device that is operated as a general purpose computer or as a special purpose hardware device and that can execute the functionality described herein as provided by the target device 130. The target device 130 can include a GPS sensor, wireless radio, or other sensor, transmitter or receiver that can be used to determine the exact or approximate location of the target device 130. Information indicating the location of the target device 130 can be transmitted over a network 114 to the beacon server 102. The target device 130 can receive content associated from an augmented beacon, when the target device 130 is within a defined geographic area associated with the augmented beacon.

The target device 130 can include one or more software applications having a beacon configuration module 144 and/or a beacon display module 148. The beacon configuration module 144 can include a user interface that allows a user of the target device 130 to add, delete, modify, or otherwise configure augmented beacons. The beacon display module 148 can include a visual display of a map or other visual representation of an area around the target device 130, where textual or graphical indicators representing augmented and/or physical beacons can be displayed and, in some instances, interacted with by a user of the target device.

More generally, implementations of the system can use appropriate hardware or software; for example, software on the beacon server 102 and/or the target device 130 can execute on a system capable of running an operating system such as the Microsoft Windows® operating systems, the Apple OS X® operating systems, the Apple iOS® platform, the Google Android™ platform, the Linux® operating system and other variants of UNIX® operating systems, and the like. The software can be implemented on a general purpose computing device in the form of a computer including a processing unit, a system memory, and a system bus that couples various system components including the system memory to the processing unit.

Some or all of the functionality described herein can be performed remotely, in the cloud, or via software-as-a-service. For example, as described above, certain functions, such as those provided by beacon server 102, can be performed on one or more servers or other devices that can communicate with target devices 130 and/or with each other. The remote functionality can execute on server class computers that have sufficient memory, data storage, and processing power and that run a server class operating system (e.g., Oracle® Solaris®, GNU/Linux®, and the Microsoft® Windows® family of operating systems).

The system can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application implemented in a suitable programming language or framework.

Method steps of the techniques described herein can be performed by one or more programmable processors executing one or more computer programs to perform functions by operating on input data and generating output. Method steps can also be performed by, and systems can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor receives instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in, special purpose logic circuitry.

In some implementations, the target devices 130 include a web browser, native application, or both, that facilitates execution of the functionality described herein. A web browser allows the device to request a web page or other program, applet, document, or resource (e.g., from a remote server, such as a web server) with an HTTP request. One example of a web page is a data file that includes computer executable or interpretable information, graphics, sound, text, and/or video, that can be displayed, executed, played, processed, streamed, and/or stored and that can contain links, or pointers, to other web pages. Examples of commercially available web browser software include the Google® Chrome™, Microsoft® Internet Explorer®, Mozilla® Firefox®, and Apple® Safari® browsers.

In other implementations, the target devices 130 include client software that provides for the implementation and execution of certain features described herein. The client software can be implemented in various forms. For example, the client software can be in the form of a native application, web page, widget, and/or Java, JavaScript, .Net, Silverlight, Flash, and/or other applet or plug-in that is downloaded to the device and runs in conjunction with a web browser. The client software and the web browser can be part of a single client-server interface; for example, the client software can be implemented as a plug-in to the web browser or to another framework or operating system. Other suitable client software architecture, including but not limited to widget frameworks and applet technology, can also be employed with the client software.

A communications network 114 can connect the beacon server 102 and target devices 130. The communication can take place over media such as standard telephone lines, LAN or WAN links (e.g., T1, T3, 56 kb, X.25), broadband connections (ISDN, Frame Relay, ATM), and wireless links (802.11 (Wi-Fi), Bluetooth, GSM, CDMA, etc.), for example. Other communication media are contemplated. The network 114 can carry TCP/IP protocol communications and HTTP/HTTPS requests made by a web browser, and the connection between the client device and servers can be communicated over such TCP/IP networks. Other communication protocols are contemplated.

The system can also be practiced in distributed computing environments, where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems, such as those mentioned above, and that operate on one or more computers having hardware, such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 2:
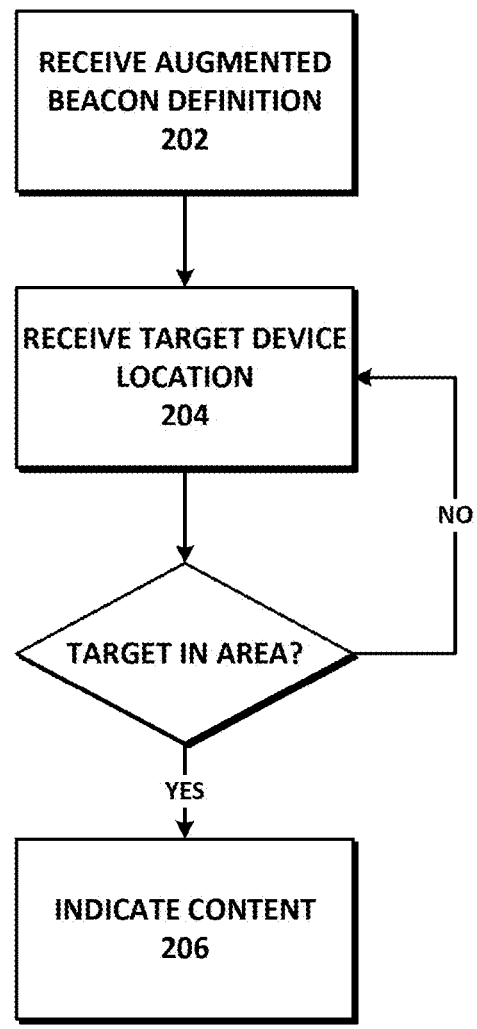
FIG. 2 depicts a method for providing an augmented beacon and delivering content associated with the augmented beacon according to one implementation of the invention.

In one implementation, the present system is a network-based system that renders the physical beacon hardware requirement unnecessary, either for the operating system of a target device or within a single application on the device. In one implementation, referring to FIG. 2, augmented beacon sponsors, administrators, or other users provide information to a cloud-based database that can be queried by target devices (STEP 202). The provided information can be a definition of an augmented beacon that includes the geographic coordinates of the augmented beacon, a geofence associated with the augmented beacon, a unique identifier associated with the augmented beacon, digital content associated with the augmented beacon, and so on.

In STEP 204, the location of a target device is received. The system establishes the exact or approximate location of the target device based on information derived from, e.g., a GPS sensor or a nearby Wi-Fi hub. Various methods are known for determining the location of a mobile device and are not described in detail here. The system compares the target device location to points/areas of interest established by augmented beacon creators (e.g., sponsors). The points/areas of interest can be polled from a custom database and/or publicly available mapping sources, such as the Google Maps™ mapping service.

If the target device is determined to be within the area defined by a particular augmented beacon, the system can indicate that content should be delivered to and/or displayed by the target device (STEP 206). For example, the system can generate and direct a notification or data message to the target device that can provide general information about the augmented beacon itself or its sponsor, or transmit an offer, such as a coupon encoded within a machine-readable code, or transmit an advertisement on behalf of the sponsor. The information provided on behalf of the augmented beacon can include text messages, images, digital credentials or certificates, machine-readable codes, videographic messages and/or multi-dimensionally-projected messages. Of note, there is no need for a physical beacon to obtain a wireless connection to the target device. Multiple connections are neither required nor juggled, and the augmented beacon requires neither local administration, geographic control, nor a power supply. These features of the augmented beacon system provide heretofore unknown flexibility and functionality in beacon deployment and capabilities.

Other use cases are contemplated. For example, the techniques described herein can be applied to location verification, authorization, and fraud detection, among other uses. In one example, confirming that the target device is within the geographical area defined by an augmented beacon is a requirement for allowing the user to complete a transaction within the area. For instance, if a user's mobile payment method is being spoofed by a fraudulent party who attempts to purchase a meal within the geographical boundaries of a restaurant associated with an augmented beacon the transaction can be declined and a fraud alert can be issued if the user's mobile device is not determined also to be within those boundaries.

Figure 3:
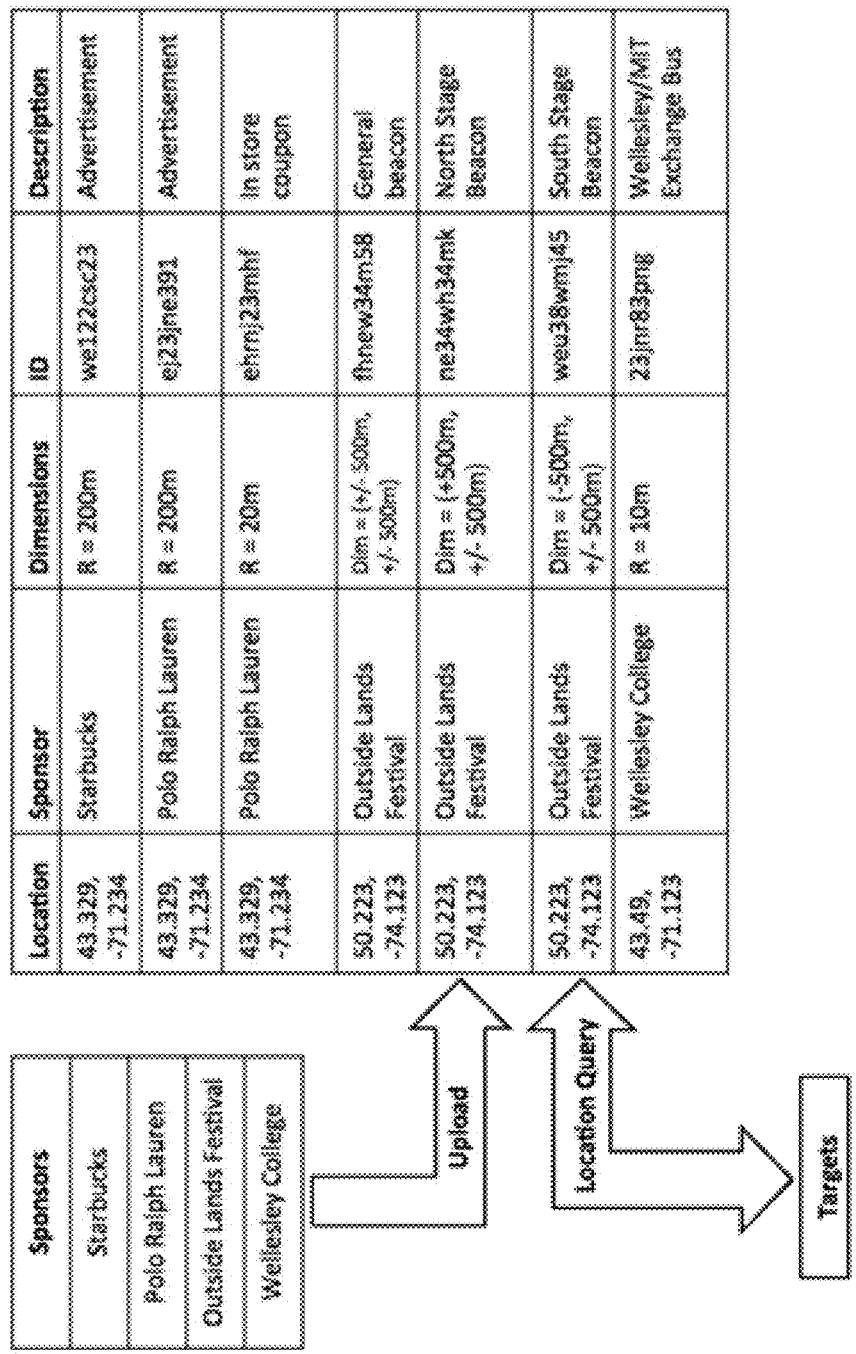
FIG. 3 depicts an example table of information associated with a set of augmented beacons.

Referring now to FIG. 3, in one example of the present system, augmented beacon sponsors upload augmented beacon configuration information to a cloud-based database that can be queried directly or indirectly by target devices. When a target device updates its location, it provides the location information to a remote server that queries the database (or, alternatively, the target device queries the database directly), searching for augmented beacons near the location of the target device (e.g., where the target device is within a geographical area defined by the augmented beacon). For example, if the target device is determined to be within 200 meters of the GPS latitude and longitude (43.329, −71.234), the message "we122csc23", serving as a unique identifier of that augmented beacon, is delivered to the device. The message can be interpreted locally on the target device, for example, by an application that recognizes the identifier (e.g., an app associated with a sponsor of the augmented beacon, Starbucks), such that content associated with the augmented beacon is displayed. The content can exist on the target device before the augmented beacon is encountered, or it can be downloaded from the database, a content server, or other source of content following interpretation of the message by the target device. In other implementations, some or all of the content is pushed to the target device by the augmented beacon.

Figure 4:
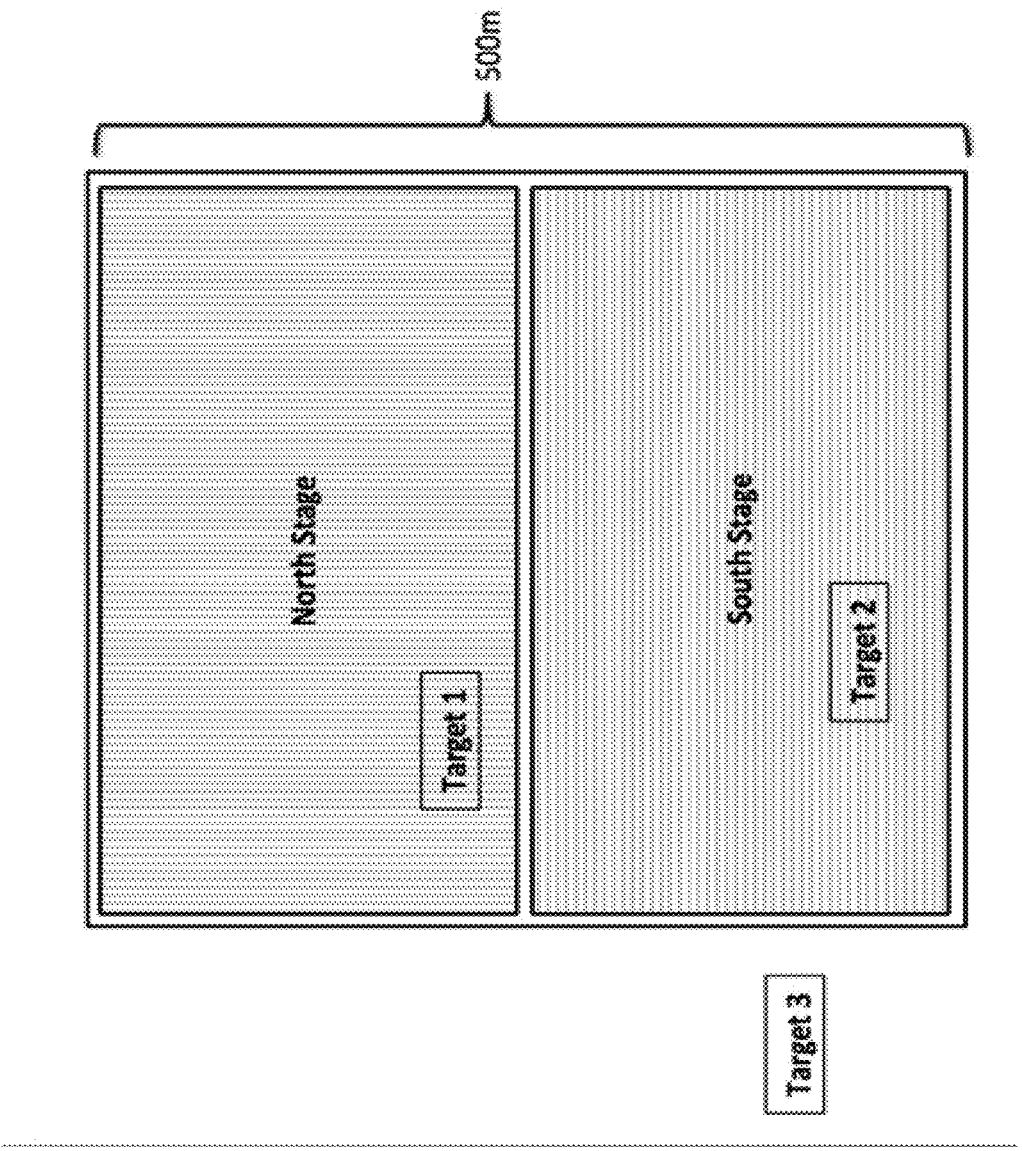
FIG. 4 depicts an example geographical layout of areas defined by a set of augmented beacons.

FIGS. 3 and 4 illustrate example geo-fence functionality provided by the present system with respect to augmented beacons sponsored by the "Outside Lands Festival." In this implementation, there exists a "general" augmented beacon that covers the entire festival (i.e., within a 500-meter rectangle of GPS coordinates (50.223, −74.123)), as well as separate augmented beacons that respectively cover the area near the festival's North Stage and South Stage, and which are visible when a target device is within 500 meters east/west of the respective augmented beacon's coordinate location and up to 250 meters north/south of the augmented beacon's coordinate location. Thus, as shown in FIG. 4, "Target 1" would receive content via the North Stage augmented beacon and the general augmented beacon, "Target 2" would receive content via the South Stage augmented beacon and the general augmented beacon, and "Target 3" would receive no content.

Another example of geo-fence functionality provided by the present system is highlighted by the "Polo Ralph Lauren" augmented beacons shown in FIG. 3. In this configuration, there is one beacon with a 200-meter range that serves as a source of advertisements for a nearby Polo Ralph Lauren store, as well as a second co-located beacon with a smaller signal radius of 20 meters, which serves to deliver coupons to users that are inside the store.

In one implementation, an augmented beacon can be a "phantom" beacon, i.e., an augmented beacon that is associated with a geo-fence in a location that has no connection to the sponsor of the beacon. A phantom beacon can be located arbitrarily, without physical control of the geographic space. For example, retailers can enjoy roadside signage in the form of beacon messages without having to make arrangements with local authorities (e.g., "Starbucks on the right in two miles.") Other use cases include competitive offerings. For example, Verizon could sponsor a phantom augmented beacon corresponding to a physical location that is on a sidewalk in front of a Sprint store. The phantom beacon can offer target devices deals from Verizon, such as six months of free texting, if they switch their carrier contract from Sprint to Verizon.

In some implementations, augmented beacons are stationary and have associated static locations within the database of the system. In other instances, augmented beacon information is dynamic and can be associated with an object in motion, such as a vehicle, person, mobile device, and the like or other dynamic systems. Actual or approximate locations for augmented beacons in motion can be established either parametrically, through periodic database refreshes, or by other known methods. An example of parametric determination is the use of an Amtrak schedule to determine the approximate location of an Acela train. An example of a database refresh is periodically scraping the location of a jitney bus from a publicly available jitney website or location database. As another example, an augmented beacon is associated with a point-of-sale system in a taxi, and GPS location data streamed from a transmitter on the taxi is used to update the location data associated with the augmented beacon, effectively causing the beacon to follow the taxi as it moves around.

Dynamic beacon information can also be temporal. For example, augmented beacon notifications can be disabled during hours that a particular sponsor's store is closed. In another example, a temporal phantom augmented beacon associated with an elementary school crosswalk can be activated during morning hours before school starts and during afternoon hours when school lets out when school children are likely to be present and safety concerns are heightened.

In one implementation, the present system does not separate the generation of the augmented beacon signal from message transmission but, instead, both are incorporated into a single instance. In this way, the management of augmented beacons, their locations, and their messaging configuration can be personalized and managed within a single application. The application can provide for self-service of augmented beacons by sponsors or other users. In one instance, with access to the system, a sponsor can set up augmented beacons on the fly, programming them as either stationary or plotting their movement, and can set up and personalize messages and related data streams, inclusive of text messages, images, digital credentials or certificates, machine-readable codes, videographic messages and multi-dimensionally-projected messages. Moreover, the application permits a geo-fence associated with an augmented beacon to be dynamically controlled and scaled by the application user, as opposed to a map vendor, a service provider, or a data vendor who is marketing data to advertisers.

In one implementation, a role-based access system permits data associated with an augmented beacon to be accessed and/or edited by all or a select group of users, such as community members within a sponsor. Editing of augmented beacons can include the creation, modification, and deletion of the augmented beacons. In one example of role-based access, a college living group is able to configure one or more augmented beacons for secure access and notifications within the community.

Figure 5:
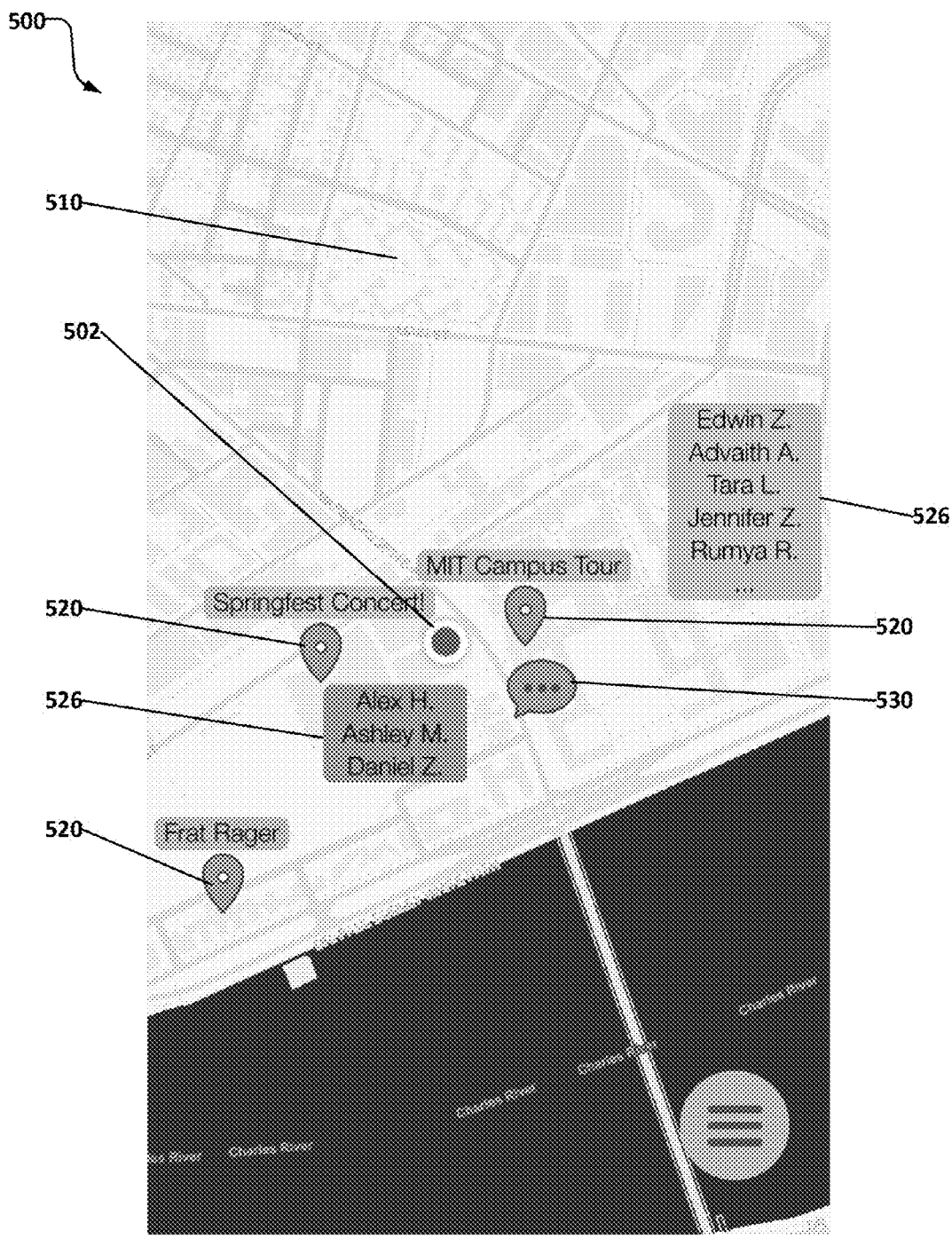
FIG. 5 depicts an example user interface for presenting graphical indicators of augmented beacons overlaid on a map.

The beacon configuration application and/or a separate application can include a user interface that displays graphical or textual indicators of augmented and/or physical beacons on a map. For example, the user interface can be displayed on a mobile device and beacon indicators within a threshold distance from the location of the mobile device (e.g., a configurable range from 1 to 2000 meters or more) can be shown on the map. FIG. 5 depicts one example of such a user interface 500, wherein graphical indicator 502 represents an augmented beacon corresponding to the geographical location on a map 510 where the augmented beacon is located. The present system can provide information associated with augmented beacons to the target device, such as augmented beacon labels, messages, and coordinates, to facilitate the display of the augmented beacon indicators. Other mapped information can be integrated with the beacon display to provide a complete, user-controlled pictorial view. For example, as shown in FIG. 5, location markers 520 can designate events or locations of interest on the map 510, and friend indicators 526 can display lists of names, icons, avatars, or other designations associated with friends or contacts of a user and/or other persons using the user interface application, whether or not known to the user, who are geographically located at or around corresponding locations on the map 510. Some markers on the map 510 can be interactive. For example, by selecting a chat icon 530 on the map 510, a user can send and/or receive messages to/from another user or communication device.

In another implementation, a technique for two-factor authentication for blacklisting unwanted content from beacons includes geographically colocating an augmented beacon with a physical beacon. In some instances, the pairing of particular beacons is known to all target devices in the system; whereas, in other instances, the pairing of particular beacons is known only to a subset of target devices.

Figure 6:
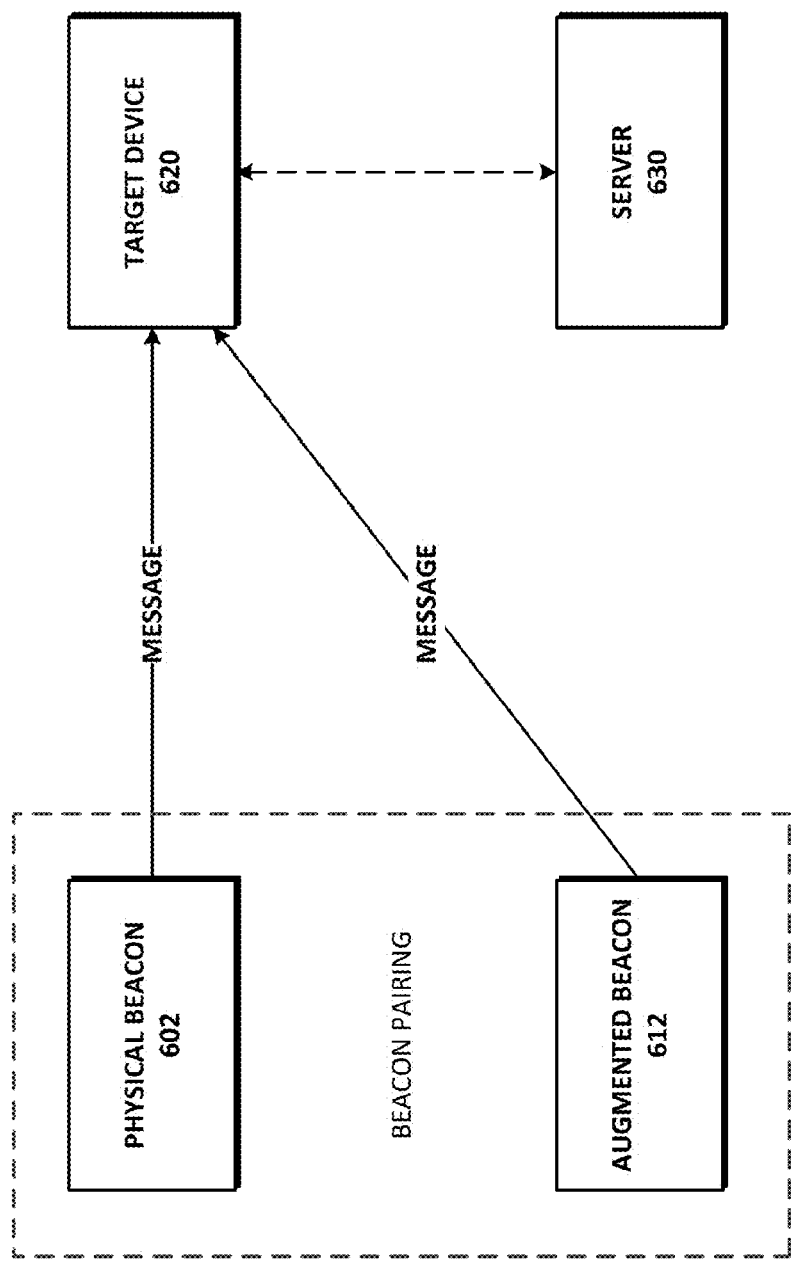
FIG. 6 depicts an example technique for two-factor authentication using colocated augmented and physical beacons.

Referring to FIG. 6, in one example of this technique, a target device 620 first receives a first message from one of a pairing of beacons (either a physical beacon 602 or an augmented beacon 612). The first message can include a unique identifier associated with the beacon sending the message, digital content, authentication information, or other data. The target device 620 stores the first message in memory and waits for a second message from the other beacon in the pairing. That is, if the first message was sent by the physical beacon 602, the target device 620 waits for a message from the augmented beacon 612, and vice-versa. Upon receiving the second message from the other beacon (the second message can include a unique identifier associated with the other beacon, digital content, authentication information, etc.), the target device 620 displays messages and/or digital content associated with the physical beacon 602 and/or the augmented beacon. In some implementations, the content displayed on the target device 620 is received directly from the beacon 602 or 612. In other implementations, the message provided by a particular beacon 602 or 612 includes an identifier that causes the target device 620 to display content already existing on the device 620 and/or retrieve content from an external server 630. If the second message is not received by the target device 620, no content associated with the physical beacon 602 or the augmented beacon 612 is delivered to or displayed on the device 620.

This authentication technique provides an added layer of security over physical beacon frameworks. In many beacon frameworks, such as the Apple iBeacon™ framework, the beacon's identifier is publicly available. This exposes the framework to spoofing or imitation of physical beacons and eliminates the possibility of secure beacon systems. By pairing a physical beacon with an augmented beacon that is associated with content stored in a secure, private relational database, the system is unable to be imitated or spoofed. Further, this serves as a functional "blacklist" for unapproved beacons. For example, if a sponsor were to set up such a system of associated physical and augmented beacons, scammers and other malicious parties would not be able to replicate sponsor beacons merely by mimicking the sponsor's physical beacons. Moreover, in this case, the presence of the physical beacon enhances the integrity of the geo-fence, because it provides evidence that the sponsor has physical site access.

In another example, a sponsor (e.g., a clothing retailer) places physical beacons in all of its stores, and places an augmented beacon associated with a target (Person A) at the store if Person A has recommended the retailer on social media. Another target (Person B) is connected in some manner to Personal A via social media. If Person B walks by the store, the system will only deliver a message to Person B when both the beacon associated with Person A and the store's physical beacon are visible to Person B (i.e., Person B is in an area defined by the range of both beacons). In this manner, the system provides more valuable messages to targets than would a traditional physical beacon implementation, as targets will receive messages only if their social media contacts also support the sponsor of the messages.

In some implementations, federated authentication, such as a Facebook login, is used to determinate a whitelist of approved sponsors of augmented beacon messages. For example, if a target device is logged into a Facebook account and the account has "liked" the sponsor Amazon.com, then beacon messages from Amazon.com would automatically be permitted to be received by the target device. If, on the other hand, the target is not logged into a particular account or if the sponsor is unknown, the target device can be configured to accept a single initial message, a subset of messages, or no messages. After the target device accepts a message from a sponsor via an augmented beacon, the target device can then be prompted to whitelist or blacklist future messages from the sponsor and/or the augmented beacon from which the message was received. In other implementations, the target device allows for the blocking of all notifications from sponsors not included on a whitelist.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention.

The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
   receiving a definition of an augmented beacon comprising a geographical area of interest, wherein digital content is associated with at least one of the augmented beacon and a physical beacon;
   determining that a target device is within the geographical area of interest of the augmented beacon;
   providing a notification to the target device from one of the augmented beacon and the physical beacon;
   receiving a confirmation from the other of the augmented beacon and the physical beacon; and
   in response to receiving the confirmation, providing an indication that the digital content associated with at least one of the augmented beacon and the physical beacon can be displayed by the target device.

2. The method of claim 1, wherein the geographical area of interest comprises geographical coordinates and a defined area based on the geographical coordinates.

3. The method of claim 1, wherein the digital content comprises at least one of a text message, an image, a digital credential or certificate, machine-readable code, a videographic message, and a multi-dimensionally-projected message.

4. The method of claim 1, further comprising:
   identifying an object in motion associated with the augmented beacon;
   determining geographical location of the object moving over time; and
   updating the definition of the augmented beacon based on the geographical location of the object.

5. The method of claim 4, wherein the object is selected from the group consisting of a vehicle, a person, and a mobile device.

6. The method of claim 4, wherein determining the location of the object comprises periodically receiving location data associated with the object.

7. The method of claim 4, wherein determining the location of the object comprises determining an approximate location of the object based on a predefined schedule.

8. The method of claim 1, wherein the target device is selected from the group consisting of a smartphone, a tablet, a smart watch, smart glasses, a laptop, a vehicle, a stand-alone sensor, an appliance, and a robot.

9. The method of claim 1, further comprising providing an application for creation and configuration of the augmented beacon.

10. The method of claim 1, wherein the definition of the augmented beacon is editable by a defined group of users.

11. The method of claim 1, further comprising providing information associated with the augmented beacon to a geographical mapping interface on the target device.

12. The method of claim 1, further comprising whitelisting a source of the digital content based on a preexisting association of a user of the target device with the source of the digital content.

13. The method of claim 1, wherein the physical beacon is geographically colocated with the augmented beacon.

14. The method of claim 1, further comprising authorizing a transaction based on the determining that a target device is within the geographical area of interest of the augmented beacon.

15. The method of claim 1, further comprising: in response to the determining, providing a unique identifier associated with the augmented beacon to the target device, wherein the unique identifier comprises an indication that the digital content associated with the augmented beacon can be displayed by the target device.

16. A system comprising:
   one or more computers programmed to perform operations comprising:
   receiving a definition of an augmented beacon comprising a geographical area of interest, wherein digital content is associated with at least one of the augmented beacon and a physical beacon;
   determining that a target device is within the geographical area of interest of the augmented beacon;
   providing a notification to the target device from one of the augmented beacon and the physical beacon;
   receiving a confirmation from the other of the augmented beacon and the physical beacon; and
   in response to receiving the confirmation, providing an indication that the digital content associated with at least one of the augmented beacon and the physical beacon can be displayed by the target device.

17. The system of claim 16, wherein the geographical area of interest comprises geographical coordinates and a defined area based on the geographical coordinates.

18. The system of claim 16, wherein the digital content comprises at least one of a text message, an image, a digital credential or certificate, machine-readable code, a videographic message, and a multi-dimensionally-projected message.

19. The system of claim 16, wherein the operations further comprise:
   identifying an object in motion associated with the augmented beacon;
   determining geographical location of the object moving over time; and
   updating the definition of the augmented beacon based on the geographical location of the object.

20. The system of claim 19, wherein the object is selected from the group consisting of a vehicle, a person, and a mobile device.

21. The system of claim 19, wherein determining the location of the object comprises periodically receiving location data associated with the object.

22. The system of claim 19, wherein determining the location of the object comprises determining an approximate location of the object based on a predefined schedule.

23. The system of claim 16, wherein the target device is selected from the group consisting of a smartphone, a tablet, a smart watch, smart glasses, a laptop, a vehicle, a stand-alone sensor, an appliance, and a robot.

24. The system of claim 16, wherein the operations further comprise providing an application for creation and configuration of the augmented beacon.

25. The system of claim 16, wherein the definition of the augmented beacon is editable by a defined group of users.

26. The system of claim 16, wherein the operations further comprise providing information associated with the augmented beacon to a geographical mapping interface on the target device.

27. The system of claim 16, wherein the operations further comprise whitelisting a source of the digital content based on a preexisting association of a user of the target device with the source of the digital content.

28. The system of claim 16, wherein the physical beacon is geographically colocated with the augmented beacon.

29. The system of claim 16, wherein the operations further comprise authorizing a transaction based on the determining that a target device is within the geographical area of interest of the augmented beacon.

30. The system of claim 16, wherein the operations further comprise: in response to the determining, providing a unique identifier associated with the augmented beacon to the target device, wherein the unique identifier comprises an indication that the digital content associated with the augmented beacon can be displayed by the target device.

* * * * *